(12) United States Patent
Cieslinski

(10) Patent No.: US 8,564,703 B2
(45) Date of Patent: Oct. 22, 2013

(54) IMAGE SENSOR WITH OVERLAPPING PIXEL READOUT AND METHOD

(75) Inventor: Michael Cieslinski, Ottobrunn (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 181 days.

(21) Appl. No.: 13/217,386

(22) Filed: Aug. 25, 2011

(65) Prior Publication Data

US 2012/0062773 A1 Mar. 15, 2012

(30) Foreign Application Priority Data

Aug. 30, 2010 (DE) .......................... 10 2010 035 811

(51) Int. Cl.
*H04N 3/14* (2006.01)
*H04N 5/335* (2011.01)

(52) U.S. Cl.
USPC .......................................................... 348/294

(58) Field of Classification Search
USPC ......................................... 348/222, 294, 308
See application file for complete search history.

(56) References Cited

U.S. PATENT DOCUMENTS

| | | | |
|---|---|---|---|
| 5,631,704 A | 5/1997 | Dickinson et al. | |
| 6,567,571 B1 | 5/2003 | Kochi et al. | |
| 7,154,548 B2 | 12/2006 | Liu | |
| 7,244,921 B2 | 7/2007 | Mabuchi | |
| 7,268,814 B1 | 9/2007 | Pain et al. | |
| 7,324,144 B1 | 1/2008 | Koizumi | |
| 7,342,212 B2 * | 3/2008 | Mentzer et al. | 250/208.1 |
| 7,538,304 B2 | 5/2009 | Ladd | |
| 7,565,033 B2 | 7/2009 | Hanson et al. | |
| 7,570,293 B2 | 8/2009 | Nakamura | |
| 7,652,703 B2 | 1/2010 | Panicacci | |
| 7,728,894 B2 | 6/2010 | Chou | |
| 7,777,798 B2 | 8/2010 | Mabuchi | |
| 7,932,752 B2 | 4/2011 | Ohba | |
| 7,948,540 B2 | 5/2011 | Ogura et al. | |
| 7,973,835 B2 | 7/2011 | Sakurai et al. | |
| 2008/0309809 A1 * | 12/2008 | Cieslinski | 348/308 |
| 2009/0002085 A1 | 1/2009 | Tarng et al. | |

(Continued)

FOREIGN PATENT DOCUMENTS

DE 10 2007 045 488 A1 4/2009
EP 0546688 B1 6/1993

(Continued)

OTHER PUBLICATIONS

German Search Report dated Jun. 30, 2011. DE 10 2010 035 811.8.
Translation of European Search Report dated Sep. 26, 2012 regarding EP Application No. EP 11 066 920.0.

*Primary Examiner* — Gevell Selby
(74) *Attorney, Agent, or Firm* — Gifford, Krass, Sprinkle, Anderson & Citkowski, P.C.

(57) ABSTRACT

An image sensor for electronic cameras includes a plurality of pixels arranged in rows and columns, wherein at least one common column is associated with a plurality of pixels of a column. Each pixel includes a light-sensitive detector element to produce an electric charge from incident light, a selection device to connect the detector element directly or indirectly to the associated column line and at least one switching device. The image sensor furthermore has a control device for controlling the selection device and the at least one switching device of the respective pixel. The control device is designed such that the selection device of a first pixel is activated within a time period in which the at least one switching device is activated in a second pixel with which the same column line is associated.

19 Claims, 5 Drawing Sheets

(56) References Cited

U.S. PATENT DOCUMENTS

Figure 1:
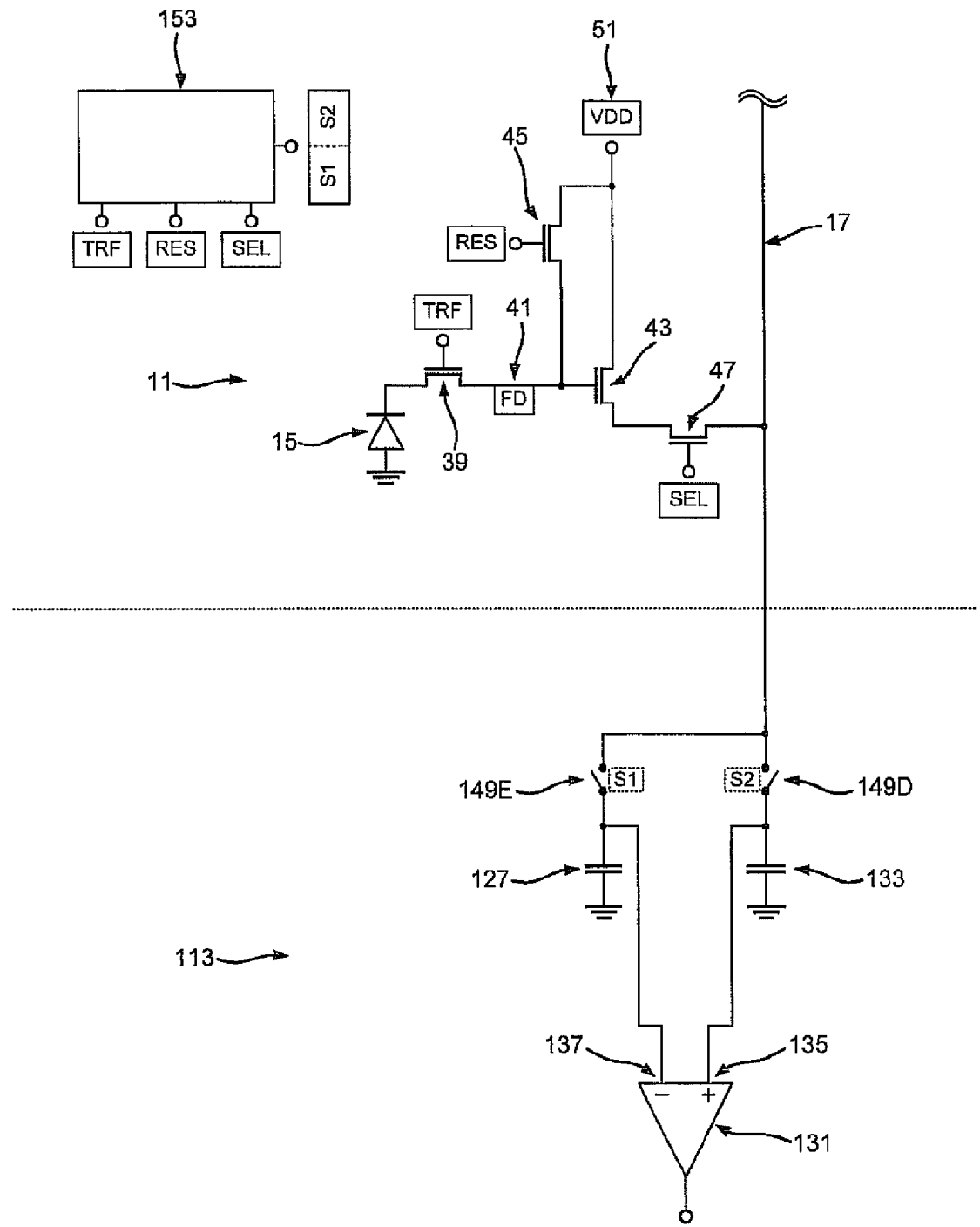

| | | | |
|---|---|---|---|
| 2009/0146196 A1* | 6/2009 | Cieslinski | 257/291 |
| 2009/0273694 A1 | 11/2009 | Krymski | |
| 2010/0073538 A1* | 3/2010 | Cieslinski | 348/301 |
| 2010/0271517 A1 | 10/2010 | De Wit et al. | |

FOREIGN PATENT DOCUMENTS

| | | |
|---|---|---|
| EP | 1928166 A2 | 6/1993 |
| EP | 0882295 B1 | 12/1998 |
| EP | 1 349 379 B1 | 10/2003 |
| WO | 02/056581 A1 | 7/2002 |

\* cited by examiner

IMAGE SENSOR WITH OVERLAPPING PIXEL READOUT AND METHOD

The present invention relates to an image sensor, in particular to a CMOS image sensor, for electronic cameras, comprising a plurality of pixels arranged in rows and columns, with at least one common column line being associated with a plurality of pixels of a column. Each pixel includes a light-sensitive detector element to produce an electric charge from incident light, a selection device to connect the detector element directly or indirectly to the associated column line and at least one switching device. The image sensor furthermore has a control device for controlling the selection device and the at least one switching device of the respective pixel. The invention further relates to a method of reading out an image sensor which comprises a plurality of pixels arranged in rows and columns.

An electronic camera is used, for example, to digitally record image sequences which are later shown in a cinema. It is advantageous in this respect if this camera also has a high image sequence in addition to a high light sensitivity and high dynamics. This is in particular important for shots which should later be played back in slow motion. A further application in which very high image sequences are required is, for example, the taking of automobile crash tests.

The image sensor of such a camera in this respect converts light incident through the objective of the camera into electrical signals and comprises a plurality of light-sensitive elements, the so-called pixels, which are usually arranged in rows and columns and form the image field. Image sensors manufactured on a silicon base in CMOS or CCD technology are typically used.

To read out an image taken by the camera, the pixels are addressed in order, for example, and a voltage proportional to the charge of the respective pixel is generated which is guided to an output of the image sensor. The pixels arranged in columns are associated with at least one common column line and can be selectively connected thereto. The column lines form the so-called column bus and direct the signals of the pixels to a signal processing circuit arranged at the margin of the image field.

In such an image sensor, the frame rate is substantially limited by two factors, namely by the throughput rate of the column bus and by the throughput rate of the signal processing circuit provided at the margin of the image field.

The throughput in the signal processing can be increased in that a plurality of signal processing circuits working in parallel are associated with respective groups of column lines.

It is, however, more difficult to increase the throughput rate of the column bus. There is, for example, the possibility to divide the column lines in the middle and to read out the upper part of the image field via signal processing circuits provided at the upper image margin, whereas the lower part of the image field is read out via signal processing circuits provided at the lower image margin.

It is furthermore known to associate two or even four parallel column lines with a column, with then two or four rows respectively being able to be read out simultaneously by said column lines. However, these lines cover a part of the light-sensitive surface of the pixel and thus reduce the light sensitivity and the dynamics. Limits are therefore set on a further increase in the number of parallel column lines.

An image sensor of the initially named kind is described, for example, in DE 10 2007 045 448 A1 and can, for example, be designed as in FIG. 1 in which only one single pixel 11 is shown as a representative. The pixel 11 shown includes a light-sensitive detector element in the form of a photodiode, in particular a so-called pinned diode (PD) 15 which is charge coupled via a switching device in the form of a transfer gate 39 to a read-out node 41 which is in particular made as a so-called floating diffusion (FD).

The readout node 41 is connected to the gate of a converter field effect transistor (FET) 43 which is made as a source follower and which represents a charge voltage converter circuit. Furthermore, the read-out node 41 is connected to a positive voltage supply 51 via a further switching device in the form of a reset FET 45. One of the two channel connections of the converter FET 43 is likewise connected to the positive supply 51, whereas the other of the two channel connections of the converter FET 43 is connectable via a selection FET 47 which acts as a row selection switch to the column line 17 associated with the pixel shown.

The column line 17 is provided to connect the pixels arranged in an associated column, in particular pixels 11, to a common column amplifier circuit 113. The column amplifier circuit 113 includes a first capacitor 127 which is connected to ground by one terminal and is selectively connectable by the other terminal via a switch 149E to the column line 17. The column amplifier circuit 113 furthermore includes a second capacitor 133 which is likewise connected to ground by one terminal and is likewise selectively connectable by the other terminal via a further switch 149D to the column line 17.

The column amplifier circuit 113 furthermore includes an amplifier 131 at whose negative input 137 the voltage applied to the first capacitor 127 is input and at whose positive input 135 the voltage applied to the second capacitor 133 is input.

The transfer gate 39 is controllable via a control line TRF; the reset FET 45 is controllable via a control line RES; the selection FET 47 is controllable via a control line SEL; the switch 149E is controllable via a control line S1; and the switch 149D is connectable via a control line S2, in each case by a common control device 153 of the image sensor.

The operation principle of such a pixel 11 will be described in the following by way of example based on a 3.3 V CMOS technology. This process is also called "correlated double sampling" (CDS). The functional steps required for this are shown by way of example in FIG. 2 for a sensor having eight pixel rows in a time sequence. Typically, all pixels in a row are read out in the same manner and in particular in parallel so that it is sufficient for the description of the read-out process only to look at those pixels which are connected to the same column line.

First, the light incident during an exposure process is converted by the pinned diode 15 into electric charge so that the pinned diode 15 fills with electrons. During light exposure, the control lines TRF, RES and SEL are each maintained at 0 V, i.e. the switches 39, 45, 47 controlled hereby are open.

For the reading out, in a first step (L; deleting the read-out node), a voltage of 3.3 V is briefly applied to the control line RES to remove charge formed by leakage currents and/or scattered light from the read-out node 41 or to delete the read-out node 41. The read-out node 41 is therefore set to a reference value defined by the supply voltage 51.

In a second step (R, reading a reference value), a voltage of 3.3 V is applied to the control line SEL so that the switch 47 is closed. The switch 149E is additionally closed. The voltage level of the read-out node 41 is thereby switched via the converter FET 43 and the selection FET 47 to the column line 17 and is thus guided to the capacitor 127. After the system has settled, the switch 47 is opened by a corresponding control signal and the capacitor 127 is simultaneously again separated from the column line 17 by opening the switch 149E.

Subsequently, in a third step (T, transfer of the charge), a voltage of 3.3 V is briefly applied to the control line TRF so that the electrons can flow from the pinned diode 15 to the read-out node 41. This transfer of the charge as a rule requires a time which is longer than the time respectively required for the above-named operation steps. If the time for the charge transfer is too short, only an incomplete transfer takes place, which results in image artifacts. Since image sensors are usually operated in a clocked manner, a work cycle is in each case provided for the aforesaid steps L and R, whereas two work cycles are provided for the transfer step, which is shown in FIG. 2 by the corresponding width of the respective symbols.

Then, in a fourth step (S, reading a signal value), the switches 47 and 149D are closed. The voltage level of the read-out node 41 is hereby switched via the converter FET 43 and the selection FET 47 to the column line 17 and is thus guided to the capacitor 133. After the system has settled, the capacitor 133 is separated from the pixel 11 again by opening the switch 149D. The switch 47 is also opened and the pixel 11 separated from the column line 17 by application of 0 V to the control line SEL.

A voltage is now applied to the output of the amplifier 131 which corresponds to the difference of the voltage stored in the capacitors 127, 133 and thus to the charge quantity generated in the pinned diode 15.

Figure 2:
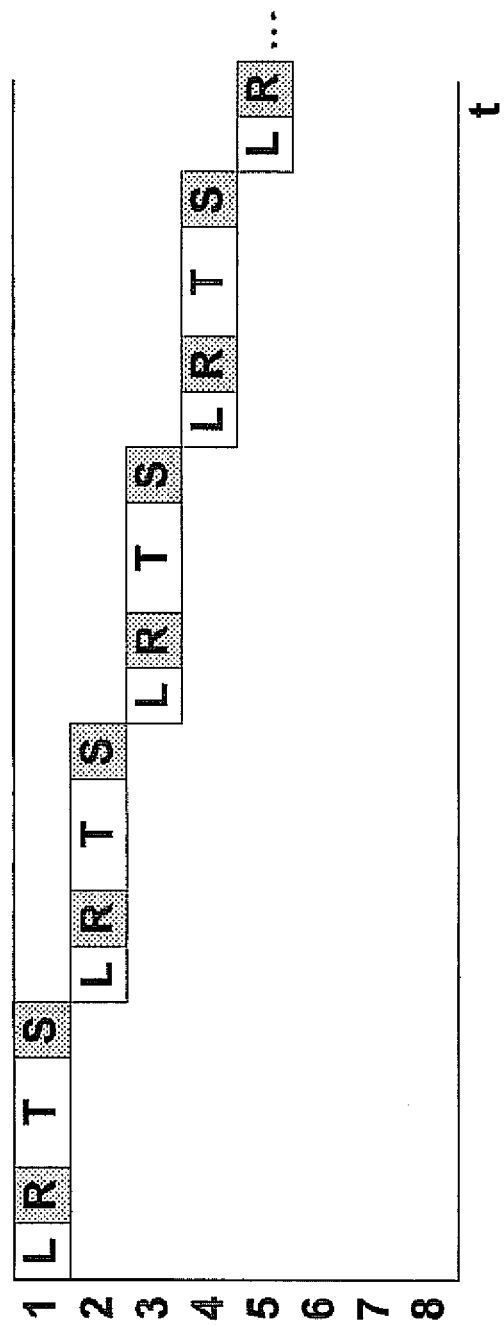

Finally, in a fifth step, not shown in FIG. 2, a voltage of 3.3 V is briefly applied to the control line RES and TRF to remove the charge from the read-out nodes 41 and to remove any residual charge from the pinned diode 15 so that the next exposure process can again start with a completely "empty" pixel.

After the steps 1 to 5 or 1 to 4 as shown in FIG. 2, have been carried out for a first pixel, these steps are subsequently repeated for the second and all further pixels connected to the respective column line 17.

It is the underlying object of the invention to provide an image sensor or a method of the initially named kind which allows the taking of images at a high frame rate.

This object is satisfied by an image sensor having the features of claim 1 and in particular in that the control device is designed so that the selection device of a first pixel is activated within a time period in which the at least one switching device is activated in a second pixel with which the same column line is associated.

The object of the invention is further satisfied by the features of the independent method claim.

The invention is based on the finding that, in particular during the activation of the at least one switching device for carrying out switching processes internally in the pixel, for example during the deleting or resetting of a read-out node to a reference value (step 1 or L) and/or during the transfer of the electric charge from the detector element to a read-out node (step 3 or T), the column line is not used in a pixel so that another pixel can be connected to the column line in this time period. Conversely, during the read-out of a measured signal at a pixel (measured signal value signal or measured reference value signal), an activation of switching processes can already take place at another pixel, for example an activation of a reset device for resetting a read-out node to a reference value (step 1 or L) and/or an activation of a transfer gate (step 3 or T). A plurality of pixels of one column are therefore simultaneously active. A temporal interleaving of the switching processes which are required for reading out the pixels and which in particular include the above-described steps 1 to 4 is thereby made possible so that ultimately the column lines are used substantially more efficiently than in a sequential activation of the pixels, as has been described above with reference to FIGS. 1 and 2. The frame rate at which the image sensor is operated can thus be considerably increased.

As a rule, the second pixel is read out after the first pixel, with a specific step, in particular here the resetting of the read-out node to a reference value (step 1 or L), being decisive for the counting of the time sequence.

The read-out order of the pixels is, however, generally as desired, i.e. said "second pixel" can also be read out before said "first pixel".

The aforesaid control principle is preferably observed for a plurality of pixels, in particular for all pixels, of the image sensor.

An activation of said switching device of the respective pixel preferably effects a change in the distribution of electric charge within the respective pixel.

In accordance with an advantageous embodiment of the invention, said at least on switching device includes a transfer gate to transfer electric charge from the detector element to a read-out node and/or a reset device to reset a charge present in the read-out node or in the detector element to a reference value and/or a converter circuit to produce at least one measured signal which is proportional to a charge present in the read-out node or in the detector element, with the evaluation device being designed for connecting the converter circuit to the associated column line.

An indirect connection of the detector element to the column line is accordingly understood as a connection in which the charge generated in the detector element is first transferred to a read-out node by activation of the transfer gate and the transferred charge is then applied to the column line by activation of the selection device either directly or, again, indirectly (in particular after conversion into said measured signal by means of the converter circuit).

Generally, the invention is therefore not restricted to a sensor having a four-transistor pixel architecture, but can rather be used in sensors having different pixel architectures such as two-transistor, three-transistor or five-transistor pixels. They can in this respect be either APS sensors ("active pixel sensors" with active pixels), i.e. sensors having an amplification of the charge generated by the detector element in the respective pixel, or PPS sensors ("passive pixel sensors" with passive pixels), i.e. sensors without any charge amplification.

In accordance with a further advantageous embodiment of the invention, the control device is further designed so that at least one switching device (for example a reset device) of a third pixel with which the same column line is associated, is additionally activated within said time period, in particular while the selection device of the first pixel is activated (i.e. during the output of a measured signal of the first pixel to or via the associated column line). The activations of the respective pixels are thereby meshed even more closely to one another in time.

In accordance with a further advantageous embodiment of the invention, the control device is designed to activate the selection device of a respective pixel after (preferably directly after) the activation of said resetting device of this pixel in time, to read out a measured reference value signal from this pixel and to activate the selection device of a respective pixel after (preferably directly after) the application of said control signal of the transfer control to the transfer gate of this pixel in time, to read out a measured signal value signal from this pixel. In other words, the reading out of the measured reference value signal takes place after the resetting of this pixel to the reference value and the reading out of a measured signal value signal from this pixel takes place after the transfer of the charge from the detector element into the read-out node.

In accordance with a further advantageous embodiment, said at least switching device of the respective signal includes at least one transfer gate to transfer electric charge from the detector element to a read-out node of the pixel and a reset device to reset a charge present in the read-out node or in the detector element of the pixel to a reference value. The control device is designed in this embodiment for the purpose of activating the selection device of a respective pixel (e.g. of said first pixel) after an activation of the reset device of this pixel to read out a measured reference value signal from this pixel and to activate the selection device of this pixel after the application of a transfer control signal to the transfer gate of this pixel to read out a measured signal value signal from this pixel.

In accordance with a further advantageous embodiment, the control device is designed to read out the measured reference value signal from the second pixel after the reading out of the measured reference value signal from the first pixel in time and before the read-out of the measured signal value signal from the first pixel in time. In this case, the time period between the two read-out processes of the first pixel which is usually required for the charge transfer between the detector element and the read-out node is therefore utilized for the reading out of the measured reference value signal from the second pixel.

Alternatively or additionally, the control device can be designed to read out the measured reference value signal from a third pixel after the reading out of the measured signal value signal from the first pixel and before the reading out of the measured signal value signal from the second pixel.

In accordance with a further advantageous embodiment, the common column line is connectable to a column amplifier circuit controllable by the control device. This column amplifier circuit includes an amplifier, a first signal memory connected or connectable to a first input of the amplifier for storing the measured signal value signal and at least one (preferably a plurality of) second signal memories selectively connectable to a second input of the amplifier for storing the measured reference value signal. The common column line is preferably selectively connectable to the first signal memory or to one of the second signal memories. One or more measured reference value signals can thus be buffered for so long until the respective associated measured signal value signal is read out. The amplifier can, for example, be a differential amplifier. The signal memories can preferably be formed as a respective capacitor. Two or three signal memories are preferably provided.

In accordance with a further advantageous embodiment, the second signal memory is designed to buffer the measured reference value signal read out from a pixel for at least as long until the measured measurement value signal is read out from a pixel read out directly preceding and/or the measured signal value signal is read out from the same pixel and/or the measured reference value signal is read out from a pixel read out directly subsequently. A very tight interleaving of the respective switching processes of different pixels is thereby possible so that the column line can be utilized in a particularly efficient manner.

In accordance with a further advantageous embodiment, the control device is designed to transfer the buffered measured reference value signal of a pixel to the column amplifier simultaneously with or directly before or directly after the measured signal value signal of the same pixel. It is thereby ensured that the measured reference value signal is provided at an input of the amplifier at the correct time.

In accordance with a further advantageous embodiment of the invention, the common column line is connected or connectable to an evaluation circuit which is controllable by the control device and which is designed for the direct digitization of the measured signals received by the column line, with the digitized measured signals being able to be buffered for a subsequent processing. In this case, a buffering of the measured signals on an analog level is not necessary since they can be applied directly to the input of a corresponding digitization circuit by the column line. A difference formation between the measured signal value signal and the measured reference value signal of a respective pixel takes place on a digital level, with the evaluation circuit taking over the association of the digitized measured signals.

The invention also relates to an image sensor, in particular to a CMOS image sensor, for electronic cameras, having a plurality of pixels arranged in rows and columns, with at least one common column line being associated with a plurality of pixels of a column and with each pixel having a light-sensitive detector element to produce an electric charge from incident light. In accordance with an embodiment, in a first pixel, a read-out step is carried out at such a time at which, in a second pixel with which the same column line is associated as the first pixel, a read-out preparation step is carried out. In this respect, in a read-out step, a reading out of the electric charge takes place via the associated column line, e.g. by activation of a selection device of the respective pixel. A switching device is e.g. activated for a read-out preparation step in the respective pixel, in particular to delete the charge in the detector element or in a read-out node of the respective pixel or to transfer the electric charge produced in the respective pixel to a read-out node of the pixel. A read-out step and a read-out preparation step are thus carried out partly or completely at the same time in two different pixels. The read-out process (totality of all read-out preparation steps and read-out steps) in the first pixel and the read-out process in the second pixel therefore overlap in time.

A control device of the image sensor can in particular be designed to output a measured signal from a first one of the pixels by activation of a respective selection device to the associate column line within a time period (=read-out step) in which in a second of the pixels, with which the same column line is associated as the first pixel, the distribution of electric charge within the second pixel is changed by activating at least one switching device (=read-out preparation step). An electric charge is preferably deleted in the detector element or in a read-out node of the second pixel by the activating of the switching device of the second pixel or an electric charge produced in the detector element of the second pixel is transferred to a read-out node of the second pixel.

In accordance with an alternative embodiment, or in addition to the aforesaid embodiment, a plurality of read-out steps are carried out sequentially in time for each exposure process of the image sensor in each pixel, with at least one read-out step being carried out in a second pixel between the plurality of read-out steps in a first pixel.

The invention also relates to a corresponding method of reading out an image sensor for electronic cameras, wherein the image sensor includes a plurality of pixels arranged in rows and columns, wherein at least one common column line is associated with a plurality of pixels of a column, wherein a plurality of measured signals are produced in each pixel for a respective exposure process of the image sensor and wherein the measured signals are output to the associated column line in a respective read-out step. In this embodiment, a plurality of read-out steps are carried out in a first of the pixels for a single exposure process of the image sensor to output a plurality of measured signals of the first pixel sequentially to the associated column line. At least one read-out step is carried out in time in a second of the pixels between the read-out steps of the first pixel. In this read-out step of the second pixel, a measured signal of the second pixel is output to the associated column line for the same exposure process.

Further advantageous embodiments of the invention are set forth in the dependent claims, in the description and in the drawings.

Figure 3:
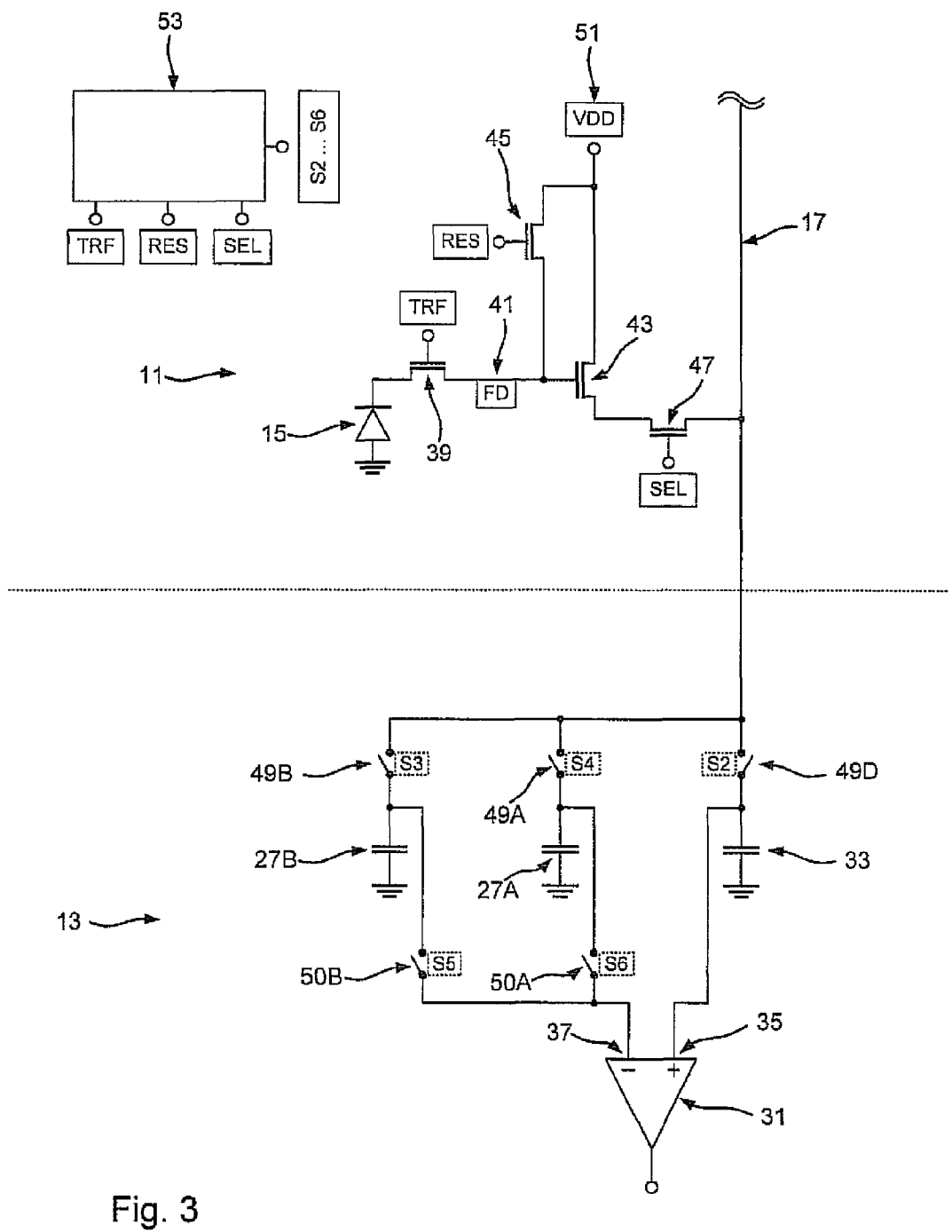
Figure 4:
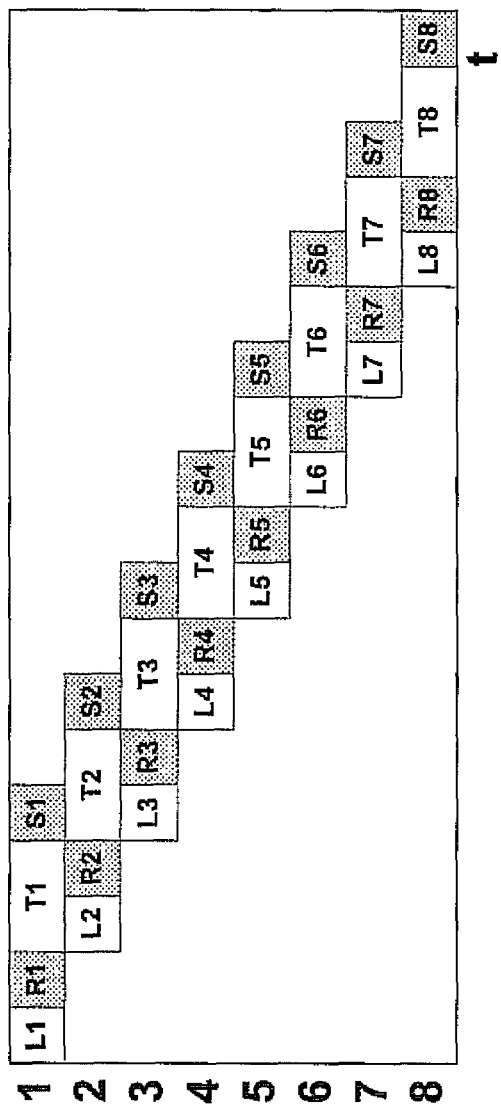
Figure 5:
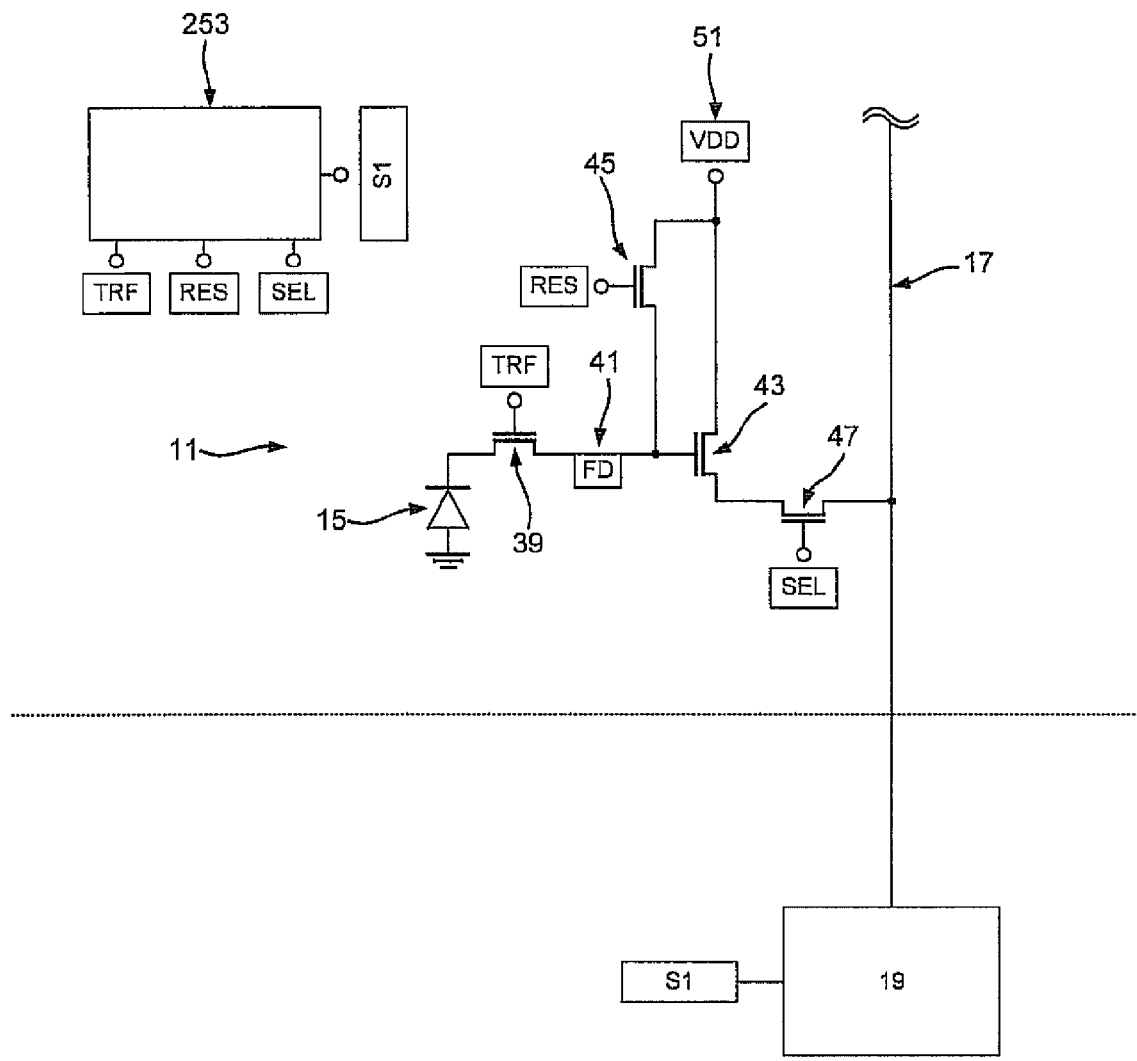

The invention will be described in the following with reference to embodiments and to the drawings. There are shown, in a schematic representation in each case, FIG. 1 a four-transistor CMOS image sensor in accordance with the prior art, with only one pixel of the image sensor and a column amplifier circuit associated with the pixel being shown;

FIG. 2 the time procedure of the reading-out of the image sensor of FIG. 1;

FIG. 3 a four-transistor CMOS image sensor in accordance with the present invention in a representation analog to FIG. 1;

FIG. 4 the time course of the reading out of the image sensor in accordance with the invention in accordance with FIG. 1 in a representation analog to FIG. 2; and FIG. 5 a four-transistor CMOS image sensor in accordance with an embodiment variant of the present invention in a representation analog to FIGS. 1 and 3.

The image sensor in accordance with the invention shown in FIG. 3 includes a pixel 11 and a column line 17 which correspond to the pixels 11 or to column line 17 described in FIG. 1 on the prior art. The image sensor in accordance with FIG. 3 furthermore includes an amplifier circuit 13 which forms a so-called sample-and-hold circuit. The amplifier circuit 13 includes an amplifier 31 corresponding to the amplifier 131 of FIG. 1 having a positive input 35 and a negative input 37, a signal value capacitor 33 corresponding to the capacitor 133 of FIG. 1, two reference value capacitors 27A, 27B corresponding to the capacitor 127 of FIG. 1, a switch 49D corresponding to the switch 149D of FIG. 1 and two switches 49A and 4913 corresponding to the switch 149E. Instead of the direct connection of the capacitor 127 having the negative input 137 of the amplifier 131 of FIG. 1, a respective switch 50A or 50B respectively is additionally provided in FIG. 3 in the connections of the capacitors 27A, 2713 to the negative input 37 of the amplifier 31.

In addition, the image sensor in accordance with FIG. 3 includes a control device 53 which corresponds to the control device 153 of FIG. 1 and which also controls, in addition to the components already described with reference to FIG. 1, the switches 49A, 49B and the switches 50A, 50B via control lines S3, S4, S5, S6 instead of the control lines S1 and S2 provided in FIG. 1.

The above components are connected to one another in the same manner as the corresponding components of FIG. 1 unless otherwise stated. The above statements on FIG. 1 therefore also form part of the disclosure of the invention.

In the following, the operation of the pixel 11 of the image sensor in accordance with the invention of FIG. 3 will be described with reference to the time diagram shown in FIG. 4, with the pixels being read out row-wise after an exposure process of the image sensor and with the pixel 11 in each case standing as a representative for the pixels of a column entered on the Y axis and numbered consecutively from 1 to 8 in FIG. 4. The pixels in accordance with FIG. 4 are therefore read out via the same column line 17 (FIG. 3).

In FIG. 4, the symbols "L" and "T" stand for the deletion or resetting of the read-out node 41 to a reference value and for the activation of the transfer gate 39 for transferring electric charge from the pinned diode 15 to the read-out node 41, respectively (so-called read-out preparation steps). In these steps, a distribution of the electric charge within the pixel 11 is changed. Analog to FIG. 2, a symbol "R" is also provided for marking the read-out of the measured reference value signal and a symbol "S" is provided for marking the read-out of the measured signal value signal (so-called read-out steps). Said symbols are supplemented by an index marking the respective pixel (i.e. the respective row). The assignment of the respective column line 17 for a respective read-out step is illustrated by hatching of the respective clock cycle in FIG. 4, namely for the read-out of the respective measured reference value signal ("R") or for the read-out of the respective measured signal value signal ("S") of a pixel of the observed column.

The "read-out of a measured signal" is to be understood in connection with the invention as the transmission of the analog measured signal from the respective pixel 11 to the associated column line 17. At the end of the column line 17, the measured signal is delivered to the associated column amplifier 31 or to the associated amplifier circuit 13 (sample-and-hold circuit).

The steps L, R, T and S carried out on reading out the pixels correspond to the steps 1 to 4 (L, R, T, S) initially explained with respect to FIG. 2 so that the respective associated switching processes will not be explained in more detail provided that they relate to the components already explained with reference to FIG. 2. As a rule, the image sensor is operated in a clocked manner, with each clock cycle having the same length. Whereas one respective clock is provided for the steps L, R and S, two clocks are provided for step T, which is symbolized in FIG. 4 by the length of the boxes characterizing the respective steps. If not otherwise mentioned, the switches 49A, 49B, 49D, 50A, 50B of the amplifier circuit 13 are in their open state.

After an exposure process, the pinned diodes 15 of the pixels 1 to 8 are filled with charge.

The read-out procedure starts with the carrying out of the step L1 for pixel 1. Subsequently, step R1 takes place, with the switch 49A in this process being closed by application of a control voltage to the control line S4. The measured reference value signal of pixel 1 is thus stored in the capacitor 27A.

The switch 49A is now opened again and step T1 lasting two clock cycles is carried out for pixel 1. Step L2 is carried out for pixel 2 during the first clock cycle of step T1 for pixel 1. During the second clock cycle of step T1 for pixel 1, step R2 is carried out for pixel 2 for the duration of which the switch 49B is closed by corresponding control of the control line 53. The measured reference value signal of pixel 2 is thereby stored in the capacitor 27B.

After termination of step T1 for pixel 1 and of step R2 for pixel 2, the step S1 is carried out for pixel 1. During step S1, the switch 49D is closed by corresponding control of the control line S2. The measured signal value signal of pixel 1 is stored in the capacitor 33.

After the closing of the switch 50A by means of the control lone S6, the measured signal pair of steps R1, S1 of pixel 1 is applied to the inputs 35, 37 of the amplifier 31 which is provided in amplified form at the output of the amplifier 31 and which here corresponds to the charge quantity produced by the exposure process in the pinned diode 15 of pixel 1. Subsequently, the capacitors 27A and 33 are again free for taking up new measured signals.

Simultaneously with the step S1 for pixel 1, the first clock cycle of step T2 is carried out for pixel 2 and step L3 is carried out in pixel 3. After the end of step S1, the read-out of the pixel 1 is substantially terminated. Optionally, however, the initially named fifth step for deleting the pinned diode 15 and the read-out node 41 can be carried out subsequently (or later).

The step R3 is carried out in pixel 3 parallel to the second clock cycle of step T2 for pixel 2. During this step, the switch 49A is in turn closed so that the measured reference value signal is stored in the capacitor 27A which had previously become free.

After termination of step T2 for pixel 2 and of step R3 for pixel 3, step S2 is now carried out for pixel 2. During this step, the switch 49D is in turn closed so that the measured signal value signal is stored in the capacitor 33 and is subsequently provided at the input 35 of the amplifier 31.

After the closing of the switch 50B by application of a control voltage to the control line S5, the measured reference value signal of the pixel 2 previously stored in the capacitor 27B is provided at the input 37 of the amplifier 31. A voltage is now applied to the output of the amplifier 31 which corresponds to the charge quantity generated by the exposure process in the pinned diode 15 of pixel 2. Subsequently, the capacitors 27A and 33 are again free for taking up new measured signals.

Simultaneously with the initiation of step S2 for pixel 2, step T3 is initiated for pixel 3 and step L4 for pixel 4. During the second clock cycle of step T3 for pixel 3, step R4 is carried out for pixel 4, with the capacitor 27B which had previously become free being available for buffering the measured reference value for pixel 4 acquired in this process.

The following steps result for pixels 3 to 8 in a corresponding manner so that finally all measured signals for the respective (single) exposure process are read out.

Various modifications result within the framework of the invention starting from the above-explained time procedure. For example, step L2 for pixel 2 can thus also only start with step S1 for pixel 2. A much less efficient utilization of the column line 17 is, however, thereby achieved.

Furthermore, step L2 for pixel 2 could also already start with step R1 for pixel 1, with then, however, at least one additional column line being necessary.

If the duration of specific steps differs from the above-described durations, for example when the transfer step T requires three instead of two clock cycles, other kinds of time interleaving would also be possible. It might well be necessary in this respect to provide further similar buffer memories instead of the two buffer memories formed by the capacitors 27A, 27B.

A further embodiment of the invention will now be described with reference to FIG. 5. This embodiment corresponds to the embodiment of FIG. 3, with the amplifier circuit 13 in FIG. 3 being replaced by an evaluation circuit 14 which is directly connected to the column line 17. A control device 253 corresponds to the control device 153 of FIG. 1 or to the control device 53 of FIG. 3, with here only one control line S1 being provided via which the control device 253 communicates with the evaluation circuit 19.

In this embodiment variant, the respective measured reference value signals and measured signal value signals are preferably transmitted to the evaluation circuit 19 directly after the reading out of pixel 11 (steps R and S) and are digitized there. A required buffering of measured reference value signals takes place on a digital level, with the evaluation circuit 19 also carrying out the subsequent association with the associated measured signal value signals.

The time sequence of steps L, R, T and S for the respective pixels can take place in the image sensor shown in FIG. 5 in the same manner as was described above with reference to FIG. 4.

REFERENCE NUMERAL LIST 11 pixel
13, 113 column amplifier circuit
15 pinned diode
17 column line
19 evaluation circuit
27A, 27B, 127 reference value capacitor
31, 131 amplifier
33, 133 signal value capacitor
35, 135 positive input
37, 137 negative input
39 transfer gate
41 read-out node
43 converter FET
45 reset FET
47 selection FET
49A, 49B,
49D, 49E switches
50A, 50B switches
51 positive supply
53, 153, 253 control device

The invention claimed is:

1. An image sensor, in particular a CMOS image sensor, for electronic cameras,
comprising a plurality of pixels (11) arranged in rows and columns, wherein at least one common column line (17) is associated with a plurality of pixels of a column and wherein each pixel (11) comprises:
a light-sensitive detector element (15) to produce electric charge from incident light;
a selection device (47) to connect the detector element (15) directly or indirectly to the associated column line (17); and
at least one switching device (39, 45); and
furthermore comprising a control device (53, 253) for controlling the selection device (47) and the at least one switching device (39, 45) of the respective pixel (11), characterized in that
the control device (53, 253) is designed such that the selection device (47) of a first pixel (11) is activated within a time period in which the at least one switching device (39, 45) is activated in a second pixel (11) with which the same column line (17) is associated,
wherein the at least one switching device comprises at least one of:
a transfer gate (39) to transfer electric charge from the detector element (15) to a read-out node (41);
or
a reset device (45) to reset a charge present in a read-out node (41) or in the detector element (15) to a reference value;
or
a converter circuit (43) to produce at least one measured signal which is proportional to a charge present in a read-out node (41) or in a detector element (15), with the selection device (47) being designed for connecting the converter circuit (43) to the associated column line (17).

2. An image sensor in accordance with claim 1, characterized in that
the control device (53, 253) is further designed such that at least one switching device (39, 45) of a third pixel (11) with which the same column line (17) is associated is additionally activated within said time period.

3. An image sensor in accordance with claim 2, characterized in that
the at least one switching device of the third pixel includes a reset device (45).

4. An image sensor in accordance with claim 1, characterized in that
the at least one switching device includes at least one transfer gate (39) to transfer electric charge from the detector element (15) to a read-out node (41) and a reset device (45) to reset a charge present in the read-out node (41) or in the detector element (15) to a reference value,
with the control device (253) being designed to activate the selection device (47) of a respective pixel after an activation of the reset device (45) of this pixel (11) to read out a measured reference value signal from this pixel (11) and to activate the selection device (47) of this pixel (11) after the application of a transfer control signal to the transfer gate (39) of this pixel (11) to read out a measured signal value signal from this pixel (11).

5. An image sensor in accordance with claim 4, characterized in that
the control device (53, 253) is designed to read out the measured reference value signal from the second pixel (11) after the read-out of the measured reference value signal from the first pixel (11) and before the read-out of the measured signal value signal from the first pixel (11).

6. An image sensor in accordance with claim 4, characterized in that
the control device (53) is designed to read out the measured reference value signal from a third pixel (11) after the read-out of the measured reference value signal from the first pixel (11) and before the read-out of the measured signal value signal from the second pixel (11).

7. An image sensor in accordance with claim 4, characterized in that
the common column line (17) is connectable to a column amplifier circuit (13) which is controllable by the control device (53, 253) and which includes an amplifier (31), furthermore a first signal memory (33) connected or connectable to a first input (35) of the amplifier (31) for storing the measured signal value signal and at least two second signal memories (27A, 27B) selectively connectable to a second input (37) of the amplifier (31) for storing the measured reference value signal, with the common column line (17) being selectively connectable to the first or to one of the second signal memories (27A, 27B, 33).

8. An image sensor in accordance with claim 7, characterized in that
the second signal memories (27A, 27B) are designed to buffer the measured reference value signal read out from the first pixel (11) for at least as long until the measured reference value signal is also read out of the second pixel (11).

9. An image sensor in accordance with claim 8, characterized in that
the control device (53, 253) is designed to transfer the buffered measured reference value signal of the first pixel (11) to the amplifier (31) simultaneously with or directly before or directly after the measured signal value signal of the first pixel (11).

10. An image sensor in accordance with claim 1, characterized in that
the common column line (17) is connected or connectable to an evaluation circuit (19) which is controllable by the control device (253) and which is designed for the direct digitizing of the measured signals received by the column line (17), with the digitized measured signals being bufferable for a subsequent processing.

11. A method of reading out an image sensor, in particular a CMOS image sensor, for electronic cameras, wherein the image sensor includes a plurality of pixels (11) arranged in rows and columns, wherein at least one common signal line is associated with a plurality of pixels (11) of a column, wherein in each pixel (11)
a measured signal is produced based on an electric charge generated in dependence on light exposure; and
the measured signal is output to the associated column line (17),
characterized in that
the measured signal in a first of the pixels (11) is output to the associated column line (17) within a time period in which at least one switching process takes place in a second of the pixels with which the same column line (17) is associated,
wherein the at least one switching process comprises at least one of:
transferring the electric charge generated in dependence on light exposure from a detector element (15) to a read-out node (41); or
resetting an electric charge present in the read-out node (41) or in the detector element (15) to a reference value.

12. A method in accordance with claim 11, characterized in that
a switching process is additionally carried out in a third pixel (11) within said time period.

13. A method in accordance with claim 12, characterized in that
the switching process in the third pixel includes a resetting of a charge which is present in a read-out node (41) of the third pixel.

14. A method in accordance with claim 11, characterized in that
a measured reference value signal is read out from this pixel (11) after the resetting of the electric charge to the reference value in the respective pixel and a measured signal value signal is read out from this pixel (11) after the transferring of the electric charge to the read-out node (41) of the respective pixel (11).

15. A method in accordance with claim 14, characterized in that
the measured reference value signal is read out from the second pixel (11) after the read-out of the measured reference value signal from the first pixel (11) and before the read-out of the measured signal value signal from the first pixel (11).

16. An image sensor, in particular a CMOS image sensor, for electronic cameras,
comprising a plurality of pixels (11) arranged in rows and columns, wherein at least one common column line (17) is associated with a plurality of pixels of a column and wherein each pixel (11) comprises:
a light-sensitive detector element (15) to produce electric charge from incident light;
a selection device (47) to connect the detector element (15) directly or indirectly to the associated column line (17); and
at least one switching device (39, 45); and
furthermore comprising a control device (53, 253) for controlling the selection device (47) and the at least one switching device (39, 45) of the respective pixel (11), characterized in that
the control device (53, 253) is designed such that the selection device (47) of a first pixel (11) is activated within a time period in which the at least one switching device (39, 45) is activated in a second pixel (11) with which the same column line (17) is associated, wherein the control device (53, 253) is further designed such that at least one switching device (39, 45) of a third pixel (11) with which the same column line (17) is associated is additionally activated within said time period, wherein the at least one switching device of the third pixel includes a reset device (45).

17. An image sensor, in particular a CMOS image sensor, for electronic cameras, comprising a plurality of pixels (11) arranged in rows and columns, wherein at least one common column line (17) is associated with a plurality of pixels of a column and wherein each pixel (11) comprises:

a light-sensitive detector element (15) to produce electric charge from incident light;

a selection device (47) to connect the detector element (15) directly or indirectly to the associated column line (17); and at least one switching device (39, 45); and furthermore comprising a control device (53, 253) for controlling the selection device (47) and the at least one switching device (39, 45) of the respective pixel (11), characterized in that the control device (53, 253) is designed such that the selection device (47) of a first pixel (11) is activated within a time period in which the at least one switching device (39, 45) is activated in a second pixel (11) with which the same column line (17) is associated, wherein the at least one switching device includes at least one transfer gate (39) to transfer electric charge from the detector element (15) to a read-out node (41) and a reset device (45) to reset a charge present in the read-out node (41) or in the detector element (15) to a reference value, with the control device (253) being designed to activate the selection device (47) of a respective pixel after an activation of the reset device (45) of this pixel (11) to read out a measured reference value signal from this pixel (11) and to activate the selection device (47) of this pixel (11) after the application of a transfer control signal to the transfer gate (39) of this pixel (11) to read out a measured signal value signal from this pixel (11).

18. An image sensor, in particular a CMOS image sensor, for electronic cameras, comprising a plurality of pixels (11) arranged in rows and columns, wherein at least one common column line (17) is associated with a plurality of pixels of a column and wherein each pixel (11) comprises:

a light-sensitive detector element (15) to produce electric charge from incident light;

a selection device (47) to connect the detector element (15) directly or indirectly to the associated column line (17); and at least one switching device (39, 45); and furthermore comprising a control device (53, 253) for controlling the selection device (47) and the at least one switching device (39, 45) of the respective pixel (11), characterized in that the control device (53, 253) is designed such that the selection device (47) of a first pixel (11) is activated within a time period in which the at least one switching device (39, 45) is activated in a second pixel (11) with which the same column line (17) is associated, wherein the common column line (17) is connected or connectable to an evaluation circuit (19) which is controllable by the control device (253) and which is designed for the direct digitizing of the measured signals received by the column line (17), with the digitized measured signals being bufferable for a subsequent processing.

19. A method of reading out an image sensor, in particular a CMOS image sensor, for electronic cameras, wherein the image sensor includes a plurality of pixels (11) arranged in rows and columns, wherein at least one common signal line is associated with a plurality of pixels (11) of a column, wherein in each pixel (11)

a measured signal is produced based on an electric charge generated in dependence on light exposure; and the measured signal is output to the associated column line (17), characterized in that the measured signal in a first of the pixels (11) is output to the associated column line (17) within a time period in which at least one switching process takes place in a second of the pixels with which the same column line (17) is associated, wherein a switching process is additionally carried out in a third pixel (11) within said time period, wherein the switching process in the third pixel includes a resetting of a charge which is present in a read-out node (41) of the third pixel.

* * * * *